(12) United States Patent
Geyer et al.

(10) Patent No.: US 7,840,596 B2
(45) Date of Patent: *Nov. 23, 2010

(54) METHOD AND APPARATUS FOR PERSISTENT REAL-TIME COLLABORATION

(75) Inventors: Werner Geyer, Boston, MA (US); Michael Muller, Medford, MA (US); Elizabeth Anne Brownholtz, Andover, MA (US); David Ryant Millen, Boxford, MA (US)

(73) Assignee: International Business Machines Corporation, Armonk, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 11/854,629

(22) Filed: Sep. 13, 2007

(65) Prior Publication Data

US 2008/0162551 A1 Jul. 3, 2008

Related U.S. Application Data

(63) Continuation of application No. 10/757,756, filed on Jan. 15, 2004, now Pat. No. 7,296,023.

(51) Int. Cl.
*G06F 7/00* (2006.01)
*G06F 17/30* (2006.01)
*G06F 15/16* (2006.01)

(52) U.S. Cl. .................. 707/790; 707/802; 707/803

(58) Field of Classification Search ............... 707/10, 707/790, 802–803; 709/203–229
See application file for complete search history.

(56) References Cited

U.S. PATENT DOCUMENTS

| | | | | |
|---|---|---|---|---|
| 6,185,612 B1 * | 2/2001 | Jensen et al. | ............... | 709/223 |
| 6,202,081 B1 * | 3/2001 | Naudus | ..................... | 709/200 |
| 6,513,033 B1 * | 1/2003 | Trauring | .......................... | 1/1 |
| 6,772,393 B1 * | 8/2004 | Estrada et al. | ............. | 715/222 |
| 6,973,477 B1 * | 12/2005 | Martino | ..................... | 709/203 |
| 7,043,529 B1 * | 5/2006 | Simonoff | .................... | 709/205 |
| 7,140,036 B2 * | 11/2006 | Bhagavatula et al. | ........... | 726/2 |

* cited by examiner

*Primary Examiner*—Cam Y Truong
*Assistant Examiner*—Cecile Vo
(74) *Attorney, Agent, or Firm*—David A. Dagg (57) ABSTRACT

A collaboration server is described that enables both real-time conferencing and content management. Thus, client applications can connect to the server to share data and collaborate in real-time. The server allows fine grained sharing of any type of content using generic shared objects (GSO). Each GSO holds one or more pieces of persistent information and defines a list of people who are allowed to access the information. Each GSO also represents a persistent conferencing session, i.e., if clients modify GSOs, modifications are broadcast to all the other clients on the list of the shared object if they are connected. The server also manages relationships between shared objects; i.e., shared objects could be contained in other shared objects or reference other shared objects.

13 Claims, 7 Drawing Sheets

METHOD AND APPARATUS FOR PERSISTENT REAL-TIME COLLABORATION

CROSS-REFERENCE TO RELATED APPLICATIONS

The present application is a Continuation application under 35 U.S.C. 120 of commonly owned prior application Ser. No. 10/757,756, filed Jan. 15, 2004 now U.S. Pat. No. 7,296,023 in the names of Werner Geyer et al., now allowed, having a title of "METHOD AND APPARATUS FOR PERSISTENT REAL-TIME COLLABORATION".

FIELD OF THE INVENTION

This invention relates generally to the field of collaboration systems and more particularly to a method and apparatus enabling asynchronous and synchronous collaboration between multiple users using persistent objects.

BACKGROUND OF THE INVENTION

There are many situations in a business environment where it is advantageous for multiple individuals to collaborate on a shared resource. For example, many web conferencing systems allow users to share an application, such as a presentation or white board, with multiple, geographically diverse users simultaneously viewing and modifying the application on a browser at their personal computer. In this manner web-conferencing allows multiple users to exchange and develop ideas synchronously, in real-time. Typically, however, the web-conference state is not persistent, and therefore when the web-conference is terminated, the information related to the conference is deleted, making it difficult for users to easily pick up a discussion thread where it was left off. Some systems provide support for persistent sessions through the use of server-side clients having the specialized purpose of recording the various media used during a conference (audio, video or data). While these systems provide persistence of the conference, they typically do not enable individual users to access the data outside of the web-conferencing forum.

Other collaborative technologies allow users to share access to resources through the use of content management systems, such as a document repository. Access to content is controlled via an access list, and users on the access list may create, modify or delete documents in the workspace. The accesses to the content are asynchronous, and thus any modification to content are not seen by a user until the user directly accesses the content via the content management system. If it is desired to collaborate synchronously on the content at some time, it is generally copied into a conference system. Because the conferencing system is disconnected from the content management system, the content exists in two different venues, creating a potential for data inconsistencies to be created. In addition, moving from one system to the other introduces breaks in the workflow, thereby impacting overall collaboration efficiency.

Because collaborative activities typically consist of several phases of asynchronous and synchronous interactions, it is desirable to support seamless transitions between the phases to improve work efficiencies and reduce the potential of data inconsistencies. Some existing collaboration systems attempt to support seamless transitions on the user interface level, but the underlying technology still maintains the two separate and distinct systems of content management and conferencing servers. One problem with the combination of the technologies in this manner is the increased network traffic between the content management system and the server, which reduces the overall efficiency of the collaboration. An additional problem with the combination of the technologies is the continued potential for data inconsistency arising from the interface of multiple servers and content management associated with the collaborators.

A further problem with both types of collaboration systems is the cumbersome set up required for both systems. For example, web-conference initialization requires authentication of authorized users and establishment of connectivity between the users, content and application. Content management systems require users to create an 'on-line place' before any content can be shared. Thus, the overhead required for establishing such systems makes them undesirable tools for collaborating on a fine grained level.

It would be desirable to identify a method and apparatus that would enable users to seamlessly transition between synchronous and asynchronous collaborate on any type of content.

SUMMARY OF THE INVENTION

According to one aspect of the invention, a server includes a storage device for storing an object data structure having a plurality of entries defining attributes of an object, the plurality of attributes apportioned into general entries and variable entries, the general entries including a list of members having access to the object and the variable entries including at least one item of persistent information associated with the object. The storage device also includes broadcast logic for broadcasting changes to the object data structure to the at least one member having access to the object.

According to another aspect of the invention, a method of sharing at least one item of information between at least two clients coupled to a server is provided. The method includes the step of associating an object with the item of information, the object including a member list indicating clients having access to the item of information, the member list including the at least two clients, a name of the item of information and a value of the information. One of the clients requests modification of the object associated with the item of information. The method includes the steps of selectively modifying the object in response to the request from the one of the clients and reflecting the modification of the other one of the at least two clients.

According to another aspect of the invention, a client device coupled to a server is provided. The client device includes a storage device for storing an object data structure having a plurality of entries defining attributes of an object, the plurality of attributes apportioned into general entries and variable entries, the general entries including a list of members having access to the object and the variable entries including at least one item of persistent information associated with the object. The client device also includes an application programming interface enabling the client to communicate with a server, including logic for requesting changes to the object data structure associated with the object, and logic for updating the contents of the object data structure in response to communication from the server.

According to another aspect of the invention, a method is provided for use at a client device coupled to a server. The method maintains a copy of an object associated with an item of information wherein the item of information is accessed by other clients coupled to the server, and the object includes a data structure storing the item of information. The method includes the steps of forwarding a request to a coupled object server, the request for modifying at least one attribute of the object associated with the item of information; receiving, from the server, an updated copy of at least a portion of the object, the updated copy of at least a portion of the object reflecting the requested modification, and replacing a corresponding portion of the object at the client device with the updated copy.

According to another aspect of the invention, a system includes a server and at least two clients coupled to the server. The server includes a storage device for storing an object data structure having a plurality of entries defining attributes of an object, the plurality of attributes apportioned into general entries and variable entries, the general entries including a list of members having access to the object and the variable entries including at least one item of persistent information associated with the object. The server also includes broadcast logic for broadcasting changes to the object data structure to the at least one member having access to the object. Each client includes a storage device for storing a copy of the object data structure including the at least one item of persistent information associated with the object and an application programming interface enabling the client to communicate with a server, including logic for requesting changes to the object data structure, and logic for updating the contents of the object data structure in response to communication from the server.

According to a further aspect of the invention, a data structure stored in a memory of a computer system having a mechanism for representing the data structure to at least two clients connected to the computer system is provided. The data structure includes a plurality of general entries including an entry identifying the at least two clients, wherein the modification of general entries is controlled by a central data structure server, and at least one variable entry, the variable entry being defined by one of the at least two clients, the variable entry including a name of an information item and a value of the information item.

According to another aspect of the invention, a collaboration system includes a plurality of objects, each object representing an item of information and having an access list identifying a group of members interested in the each object, and a relation database for storing, for at least one object, at least one identifier of at least one interested object, wherein the identifier is used to notify members in the group of the at least one interested object of changes to the item of information of the at least one object. With such an arrangement, the server process is able to support more complex collaboration through the aggregation of shared objects into hierarchies, graphs, or other structures. Shared objects can have arbitrary pointers to other shared objects. Each shared object within such a structure can have different membership. This approach allows for fine-grained access control to the data. Additionally, the server process may provide convenience functions to help manage the membership within these structures; e.g. when adding to or removing members from a single shared object, the server might provide options to propagate this operation to related shared objects. Likewise, when adding a new shared object to an existing shared object, the server may support conventions such as: aggregating the member lists of both objects, inheriting the member list of the existing objects, or allowing the member list of the new shared object to prevail.

According to a further aspect of the invention, a peer to peer collaboration system includes a first client device having a first storage device for storing a copy of at least one object to be shared with a second client device, the object having an attribute identifying information content associated with the object, and means for maintaining consistency of the information content associated with the object, including means for broadcasting changes to the information content made by the first client to the second client and means for updating the information content in response to an update notification received from the second client.

With such an arrangement, a group of members can asynchronously or synchronously modify the object, with the changes broadcast to each member of the group. Such a system may be used to establish a synchronous conferencing system, with the modified objects being persistently stored and available for access at any time thereafter. Alternatively, the system can be used to provide asynchronous control of shared resources, such as in a document repository. Seamless transitions between the two types of information access are readily supported. In addition, because the sharing of the resource involves only establishing the object at the server, and relationships between objects are controlled, the system provides for fine grained sharing of resources. Thus, the present invention provides a mechanism for seamlessly and efficiently controlling asynchronous and synchronous access to shared resources without the potential for data inconsistencies.

DETAILED DESCRIPTION

Figure 1:
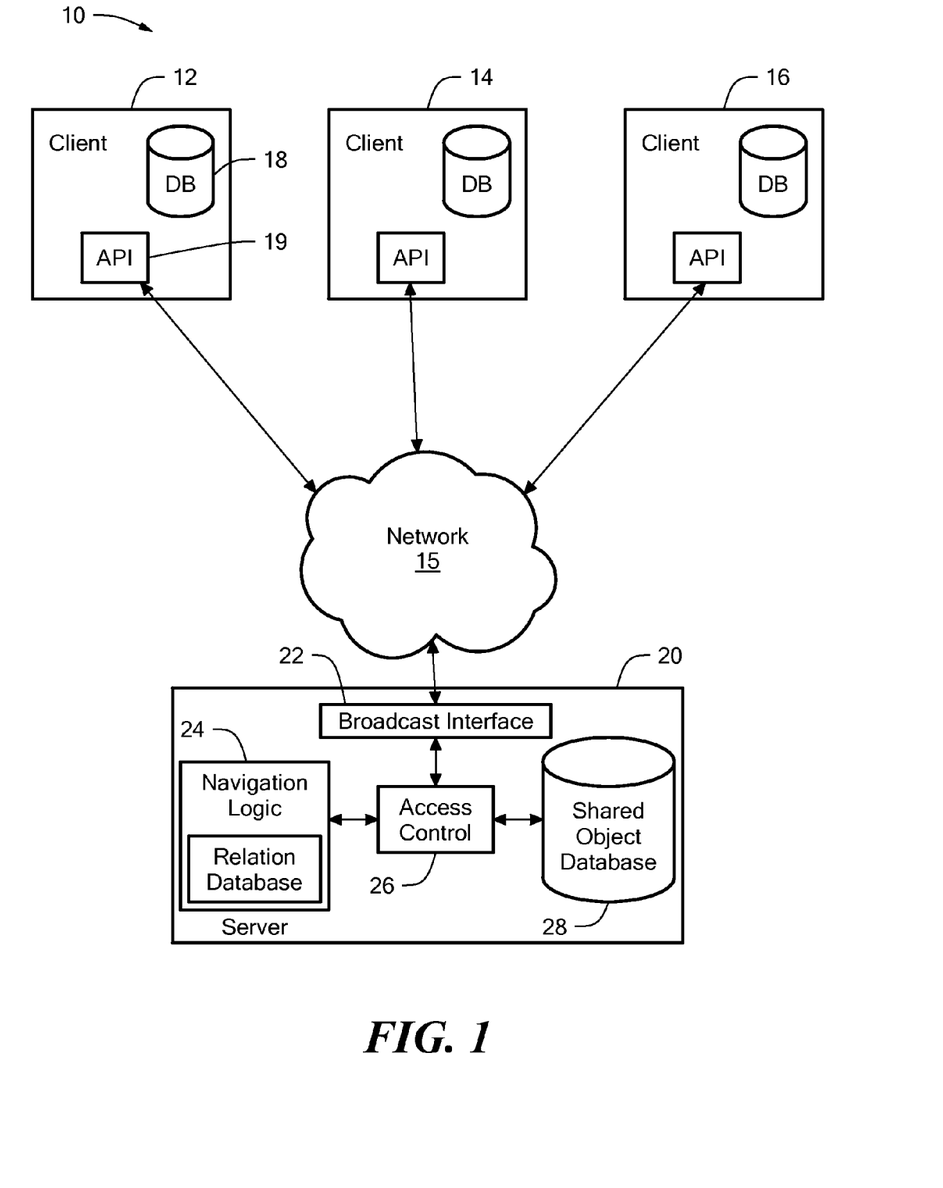
FIG. 1 illustrates a system in which the present invention may be utilized, including a number of clients connected to a server.

FIG. 1 illustrates a network 10 in which the present invention may be implemented, including a server 20 coupled to a set of clients 12, 14 and 16. For the purposes of this application, the clients and the server communicate over a network 15 which may be any type of interconnecting network, including the Internet or a Local Area Network. According to one embodiment of the invention, the server 20 is a collaboration server that enables both real-time conferencing and content management. Thus, client applications can connect to the server to share data and collaborate in real-time. The server allows fine grained sharing of any type of content using generic shared objects (GSO). Each GSO holds one or more pieces of persistent information and defines a list of people who are allowed to access the information. Each GSO also represents a persistent conferencing session, i.e., if clients modify GSOs, modifications are broadcast to all the other clients on the list of the shared object if they are connected. The server also manages relationships between shared objects; i.e., shared objects could be contained in other shared objects or reference other shared objects. As an example, the server might support hierarchical storage of shared objects similar to a file system. The advantages of this system are high flexibility in developing new collaborative applications without the need of defining semantics on the server side, protocol efficiencies through combining conferencing and content management in one system, support for fine-grained sharing of any content, support for developing applications that provide a seamless user experience with blended asynchronous and synchronous collaboration.

Figure 6:
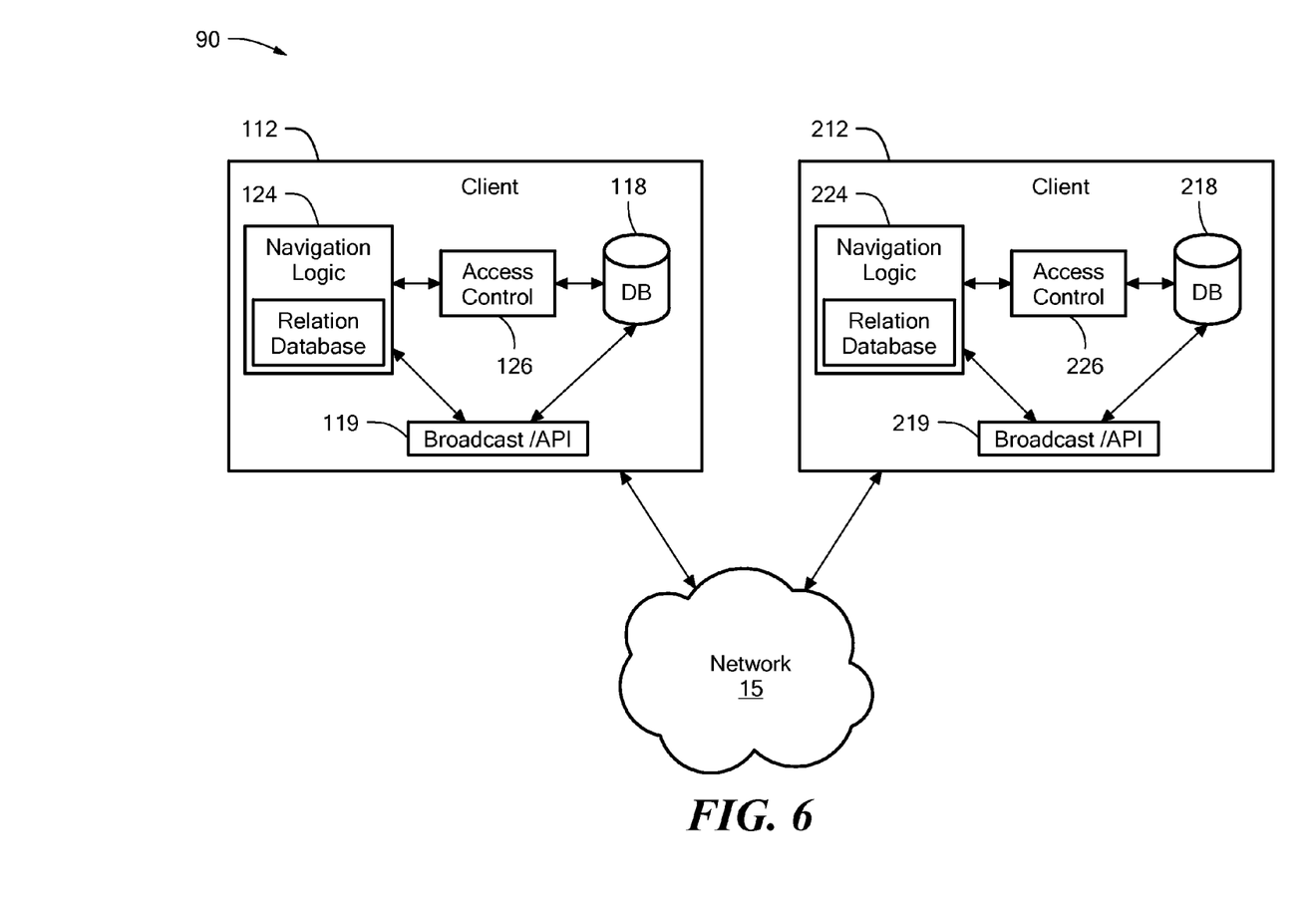
FIG. 6 is a diagram of a peer to peer network architecture in which the present invention may be used to manage Generic Shared Objects between peer devices.

Several components that may be included in a collaboration server of the present invention are shown in FIG. 1. A second embodiment of the present invention, where the server functionality is distributed to the individual clients to permit peer-to-peer object sharing will be described later herein with regard to FIG. 6. These components are representative of the functionality of the server only, and thus it is not a requirement that the exact components as illustrated be included in the server. The components are illustrated as functional blocks, each of which may be implemented in hardware, software, or some combination thereof.

Server 20 is shown to include access control logic 26 coupled to object database 28. The access control logic 26 controls access to and modification of objects within the object database 28. Coupled to the access control logic 26 is navigation logic. The navigation logic 26 includes a relation database including data defining relationships between the various GSOs stored in object database 28. Also coupled to access control logic is broadcast interface 22. The broadcast interface 22 controls the broadcast of modifications to GSOs to identified interested clients, to facilitate synchronous conferencing between clients sharing objects.

Each client that is coupled to the server of the present invention includes an application programming interface (API) and an optional database 18 to cache local copies of GSOs managed by the server. Although an independent database storage component is shown, it is understood that the database of GSOs managed by the server could be stored in any storage mechanism of a computer system, including a local cache, a file system, memory, attached disk drive, etc. The application programming interface uses a defined protocol to communicate with the server. In one embodiment, the communication protocol that is used between the client and the server may be text-based (e.g. eXtensible Markup Language (XML)) or in any binary format. As will be described in more detail later herein, the protocol is based on three basic primitives: Request, Response and Notification. A client asks for some service by forwarding a Request package to the server. The server responds with a Response package to inform the Requesting clients about the result of its request. Depending on the type of request, the server may also send Notification packages to other connected clients. Accordingly, services provided by the server merge real-time conferencing with content management, i.e., both real-time sharing of information is persistent and asynchronous shared content can be modified in real-time.

At the server 20, the object database 28 is used to store data structures for objects used by the server. The database may be, for example, a file system, databases, or any other storage mechanism to persist shared information. The objects stored in the database include both the GSOs, as well as other related objects that may be used by the server for the support of the invention, including but not limited to objects that represent a person, group objects to represent a group of members, member status objects to represent information about members with regard to a particular GSO and subscription objects to describe member's interest in real-time notification from a particular GSO.

Figure 2:
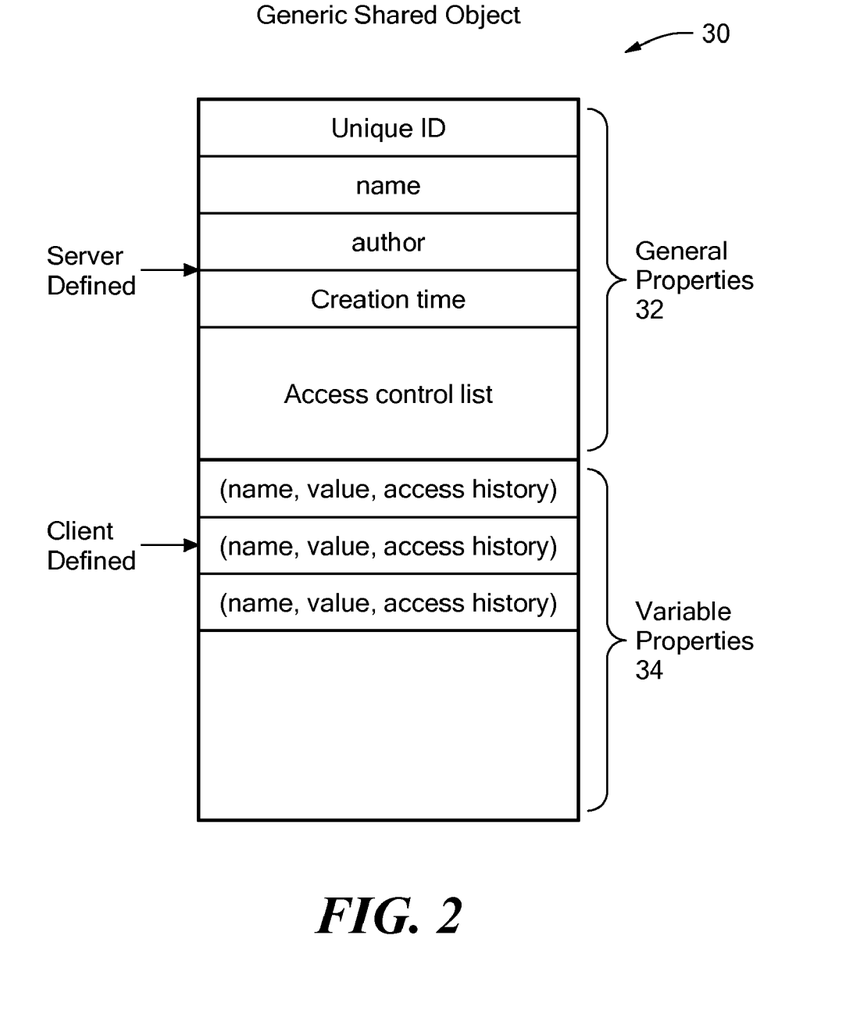
FIG. 2 is a diagram of one embodiment of a generic shared object (GSO) data structure, including representative entries that may be included in a GSO data structure according to the present invention.

Referring now to FIG. 2, a more detailed diagram illustrating one embodiment of a GSO data structure is provided. Using generic shared objects as a means of providing persistent real-time collaboration is an important aspect of the present invention. As mentioned above, each GSO holds one or more pieces of persistent information and includes a list of people who are allowed to access the information (access control list—ACL). At the same time, each GSO also represents a persistent (conferencing) session, i.e. if clients create, modify, or delete GSOs, notifications are broadcast in real-time to all the other members of the GSO (if they are connected at that time). Hence, when clients disconnect and then reconnect to the server at a later time, GSOs are still available and communication can become synchronous again if other members are present. GSOs may also be used for non-persistent communication between any members of the shared object much like a message hub.

A GSO data structure may take any form, and an exemplary GSO data structure is shown in FIG. 2. The GSO of FIG. 2 includes a set of general properties 32 and a set of variable properties 34 for content. General properties identify certain attributes of the object, without addressing the particular content of the object. General properties are generally populated by the collaboration server when the object is created, and modified by the server in response to specific requests from the clients. For example, general properties of GSOs may include unique id, name, author, creation time, modifier, modification time, reader, last access time, access control list with member and group objects, member status and subscription information pertinent to the GSO. The present invention is not limited to the inclusion of any item in the general properties other than the access control list.

Variable properties of a GSO describe the actual content of the data structure. A GSO does not provide any means for semantically describing the content. Content is associated with a GSO by adding arbitrary numbers of content identifiers to the GSO. In one embodiment, the content identifiers are represented as <name, value> pairs (properties), but it is readily appreciated that alternative methods of representing the content, for example through pointers or other mechanisms, are also within the scope of the present invention. The interpretation and use of the <name,value> pairs (or other content identifier) is left to client applications. A GSO may have multiple <name,value> pairs with the same general name, thus defining an 'activity list' for the name. For example, a given GSO having a name of 'Design' could include a <name, value> pair defining a document to be modified and a <name, value> pair defining a chat session. Members in the access control list of 'Design' can simultaneously access the document and chat session to synchronously collaborate on the design. The value field is typically a text field but could optionally also support different data types, e.g. Integer, Boolean etc. In particular, a GSO supports binary content, i.e. the value field could be a large binary object. In general, the value field could support types similar to relational database systems.

Advantageously, associated with each variable property (activity, or item of information) is an access history. The access history may be used to track the member's access to the individual data item, or activity. In one embodiment, the access history may be used for security purposes, to ensure that unauthorized members have not somehow gained access to the variable property associated with the object. In other embodiments, the access history could be used to verify that a member stores the most up to date version of an item of information. In other embodiments, the access list could be used as input to programs that seek to identify member interest in certain items of information. The access history could take a variety of forms, including an ordered list of members having recent access, the types of the most recent access (modification or simply reading), etc. It should be noted that the inclusion of the access history is not a requirement, but rather a feature, of the present invention.

The access list in the general properties of the GSO manages a list of members having access to the object. The member list may include member objects or group objects. The member list both controls access and serves as a distribution list for broadcasting notifications about creation of and modifications to a GSO. The member list is dynamic and allows adding new members or removing existing members. Since the member list is also a property of the GSO, any modification to the member list is not only stored but also broadcast to the other members of a GSO. As mentioned above, one of the general properties included in a GSO is member status information. The member status information may be used to control access to the variable properties by the members. Thus, different members having different roles may access objects in different manners. For example, some members may have modify access, whereas some may only have read access. In addition, some members may have no access to particular variable properties in the activity list of the associated with the object.

An important aspect of the present invention is that the server process supports more complex collaboration through the aggregation of GSOs into hierarchies, graphs, or other structures. Thus, GSOs can have arbitrary pointers to other GSOs. Each GSO within such a structure can have different membership. This approach allows for fine-grained access control to the data. Additionally, the server process may provide convenience functions to help manage the membership within these structures; e.g. when adding to or removing members from a single GSO, the server might provide options to propagate this operation to related GSOs. Likewise, when adding a new GSO to an existing GSO, the server may support conventions such as: aggregating the member lists of both GSOs, inheriting the member list of the existing GSO, or allowing the member list of the new GSO to prevail.

Figure 3:
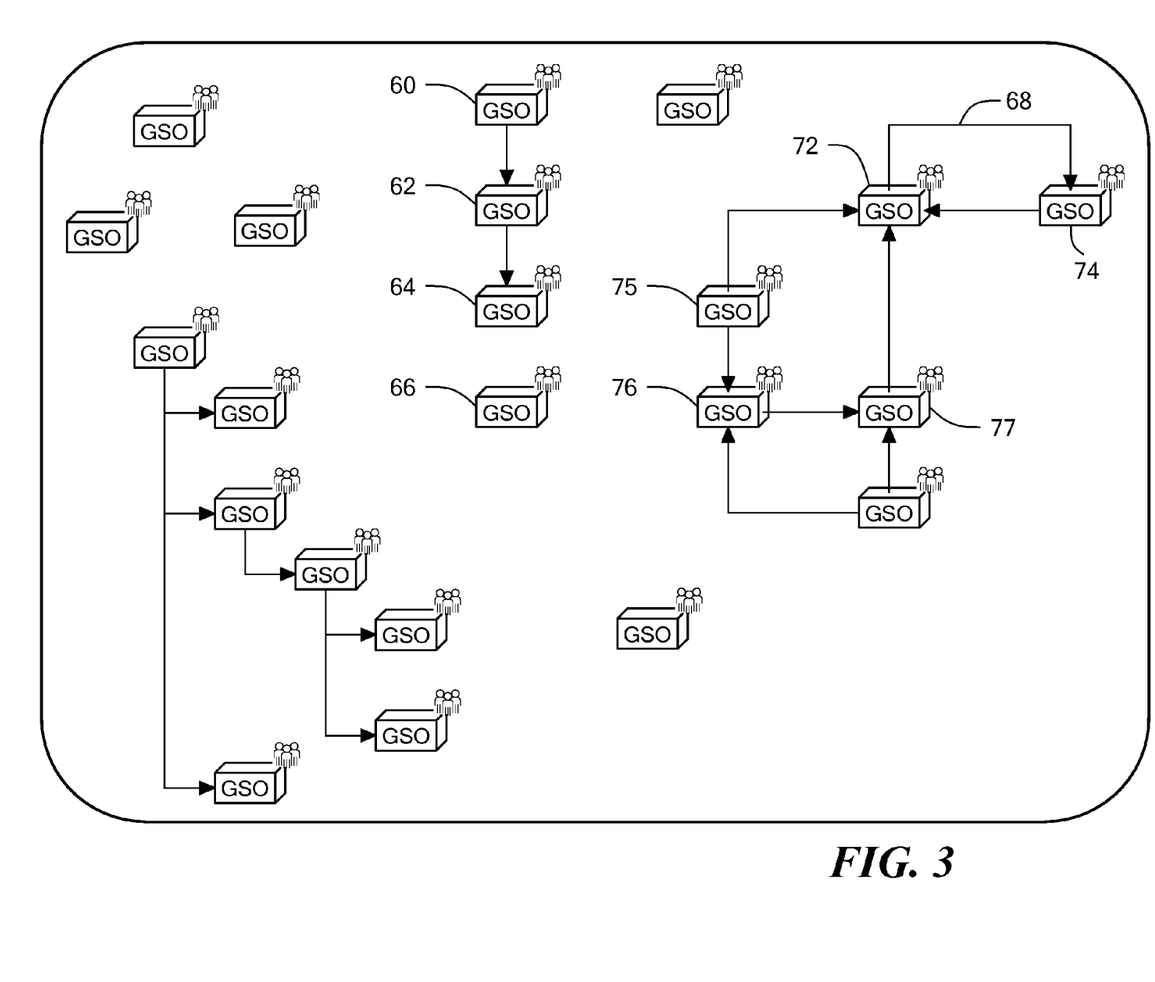
FIG. 3 is a diagram provided to illustrate the various relationships that may exist between GSOs of the present invention.

In one embodiment, a relationship data base is provided to track the relationships. This allows, for example, aggregating GSOs into hierarchies, graphs, or other structures required by more complex clients. For example, referring now to FIG. 3, a diagram is provided for illustrating a number of different relationship structures that may exist between GSOs. GSOs 60, 62 and 64 are hierarchically related. Thus, modifications to GSO 60 could be propagated to any object downwards in the hierarchy. A group of GSOs is shown having a variety of relational interconnections. In one embodiment, the relational database stores, for each object, a pointer to one or more other objects that are interested in changes to any attribute of a given object. When the given object is modified, each interested object is notified of the change to the object. The relational database may be organized in numerous manners known to those of skill in the art, and the exact structure of the database is not a limitation of the invention. Rather, any database that assists in identifying related objects may be substituted herein.

Figure 4:
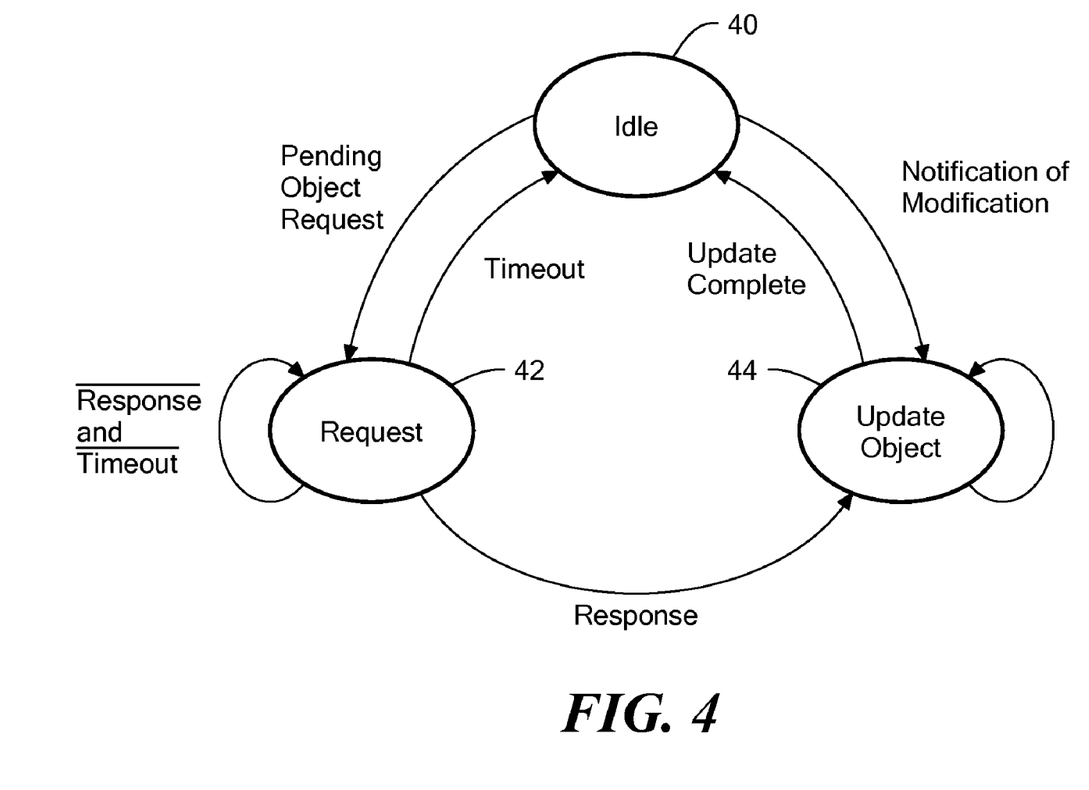
FIG. 4 is a state diagram provided to illustrate various states of a programming interface that may be included in a client device coupled to a server of the present invention designed to manage generic shared objects.

Referring now to FIG. 4, a state diagram is provided for illustrating the operation of a client that interfaces with the collaboration server of the present invention. The functionality represented by the state diagram may be implemented in the client API. The states include an Idle state 40, a Request state 42 and an Update Object state 44. When the client desires to modify a GSO, it forwards a Request package to the server. The Request package generally includes a request function and request content. Request functions include but are not limited to creating, deleting, reading, modifying or adding a property to the object. The request content identifies the attribute of the data structure seeking modification/creation/deletion and the desired content of the attribute. For example, the request function could be to add or remove a member from a list of members. Or the client may seek to add a variable property, and include the name of the property and the desired value of the property.

Once the request is forwarded to the server, the client transitions to Request state 42, where it remains until a response is received from the server, or alternatively until a predetermined time period expires. The timeout may expire as a result of the response being dropped somewhere between the client and server, or alternatively as a result of the client not being authorized to modify the object. In the event of a Timeout, the state transitions back to Idle. In the event that a Response package is received from the server, the state transitions to Update Object state 44. The system may be implemented in a variety of manners. The Response package could simply indicate to the client that the Response is granted, indicating that the client should update the Object with the desired value that it has stored. Alternatively, the Response package could include the modified value, with the client always updating the object with the value of the object received from the Server. Either way, when the object is updated, the state returns to Idle state.

As aforementioned, each GSO also constitutes a persistent, real-time conferencing session between the members of the GSO who are connected to the server. Hence, any modification to the set of fixed properties or the set of variable properties of a GSO is not only stored in the underlying database but also automatically broadcast to the other members of that GSO by sending notifications to the clients currently connected. The receipt of a Notification at the client causes the client to transition from Idle state 40 to Update Object state 44, where the contents of the object data structure are updated, and the state returns to Idle.

The server process not only sends notifications about modifications to GSOs but also broadcasts the creation of new GSOs and the deletion of existing GSOs. The default behavior could be that any modification to a GSO is broadcast. Alternatively, a subscription object, associated with each client or each client/GSO pair, could be used control the amount of notifications send out by the server process. With such an arrangement, clients can subscribe or unsubscribe to properties they are interested in hearing about.

Figure 5:
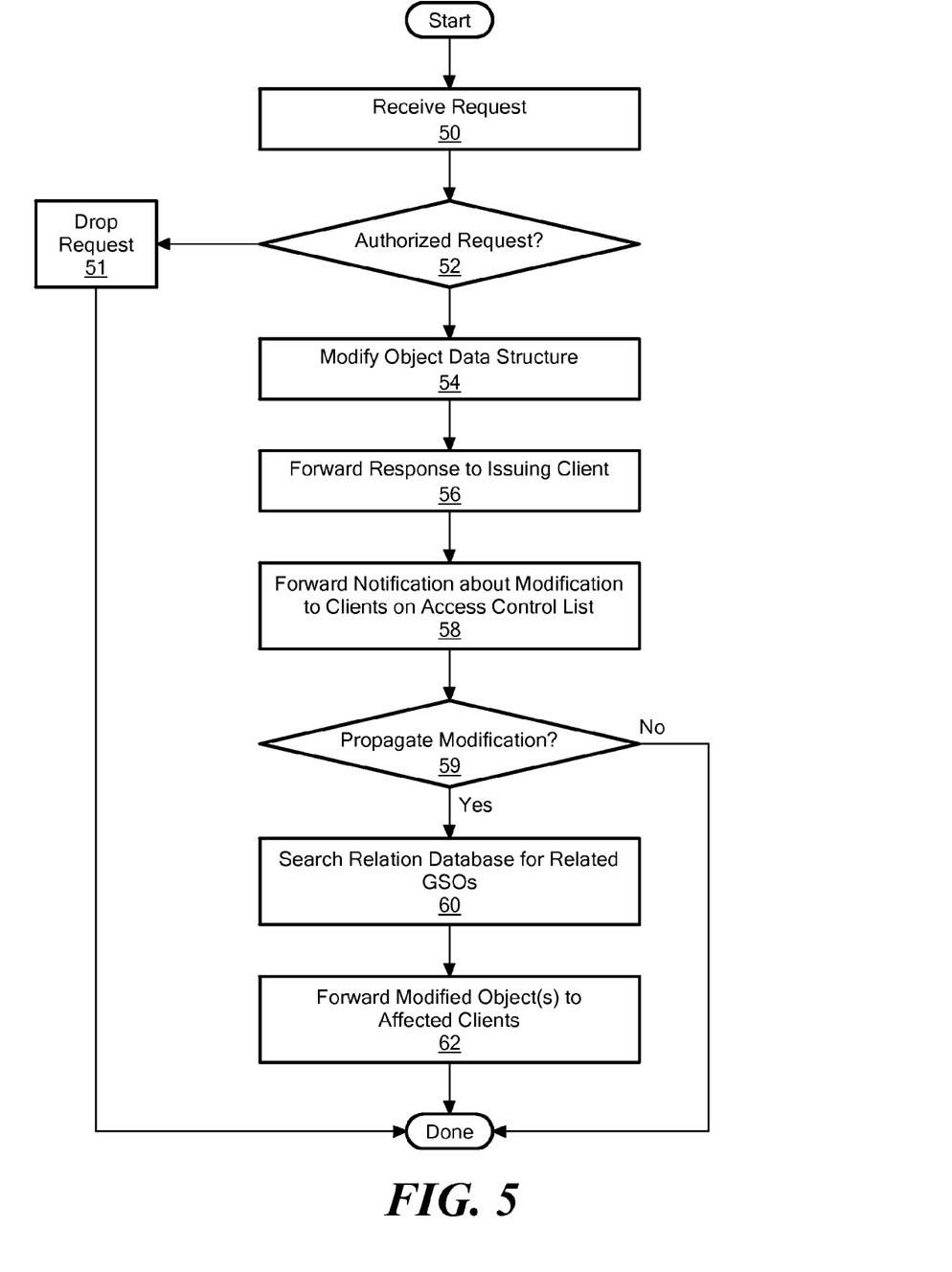
FIG. 5 is a flow diagram illustrating exemplary steps that may be used by a server of the present invention to manage Generic Shared Objects.

Referring now to FIG. 5, a flow diagram is provided illustrating several exemplary steps that may be taken at the collaboration server of the invention to control broadcast of generic shared objects for conferencing and content management purposes. At step 50, the server receives a request for creating/modification/deletion/addition of a property of a GSO. At step 52, the server determines whether the client is authorized to perform the activity on the GSO. This determination is made by comparing the client against the access control list for the GSO. If the client is unauthorized, then in one embodiment the server merely drops the request at step 51. Alternatively the server could respond with a negative acknowledgement (NACK) or some indication to the client that the request is not granted. If, however, the client is authorized, then at step 54 the server executes the request on the object, and at step 56 forwards a Response package to the requesting client. As mentioned above, the Response package may include a copy of the modified object, or may simply include a message to the client that the modification is accepted. At step 58 the server sends a Notification package to each client on the access control list of the GSO (if connected) to inform the members of the modification.

In case modifications are propagated to related GSOs, at step 59, the server searches the relationship database at step 60 to identify related GSOs and the corresponding clients that are interested in changes to the modified GSO. At step 62, the server forwards the modifications to the identified interested clients. The server may accumulate the modifications, only sending them out at the desired subscription times of the client. Alternatively, the server may send them to the client at predefined time intervals (so as not to overload the network). Also, the server may send out modifications only to clients that are subscribed to certain types of modifications. In addition, some modifications may be prioritized so that they are immediately forwarded to the clients. Thus, various techniques of controlling transmission of the modifications to the clients may be used, and the present invention is not limited to any particular technique.

Although the above embodiment has described the object server as functioning on a dedicated device, this is not a requirement of the invention. Rather, the Generic Server functionality may be implemented on any device, whether it is a client or a server. For example, referring now to FIG. 6, an example is provided of the support of GSOs in a peer-to-peer networked environment. In the peer-to-peer embodiment, each client runs an instance of the collaboration server and the collaboration servers talk to each other to broadcast modifications. For example, two clients, 112 and 212 each include functionality previously described on the GSO server. For example, client 124 includes navigation logic and relation database 124, access control logic 126 and database 118. Where only two client devices are coupled, it may be that the navigation logic and relation database format are simplified, indicating whether or not the partner client has access to the object or not. However, for systems wherein three or more clients communicate peer-to-peer, the logic is substantially similar to that previously described. Each client would have an network interface that integrates the broadcast functionality, described with regard to FIG. 5, with the API of FIG. 4. Thus, whenever one client seeks to modify an object, it notifies the other clients of the modification, and awaits receipt from the other client that the request has been processed at the peer device.

Figure 7:
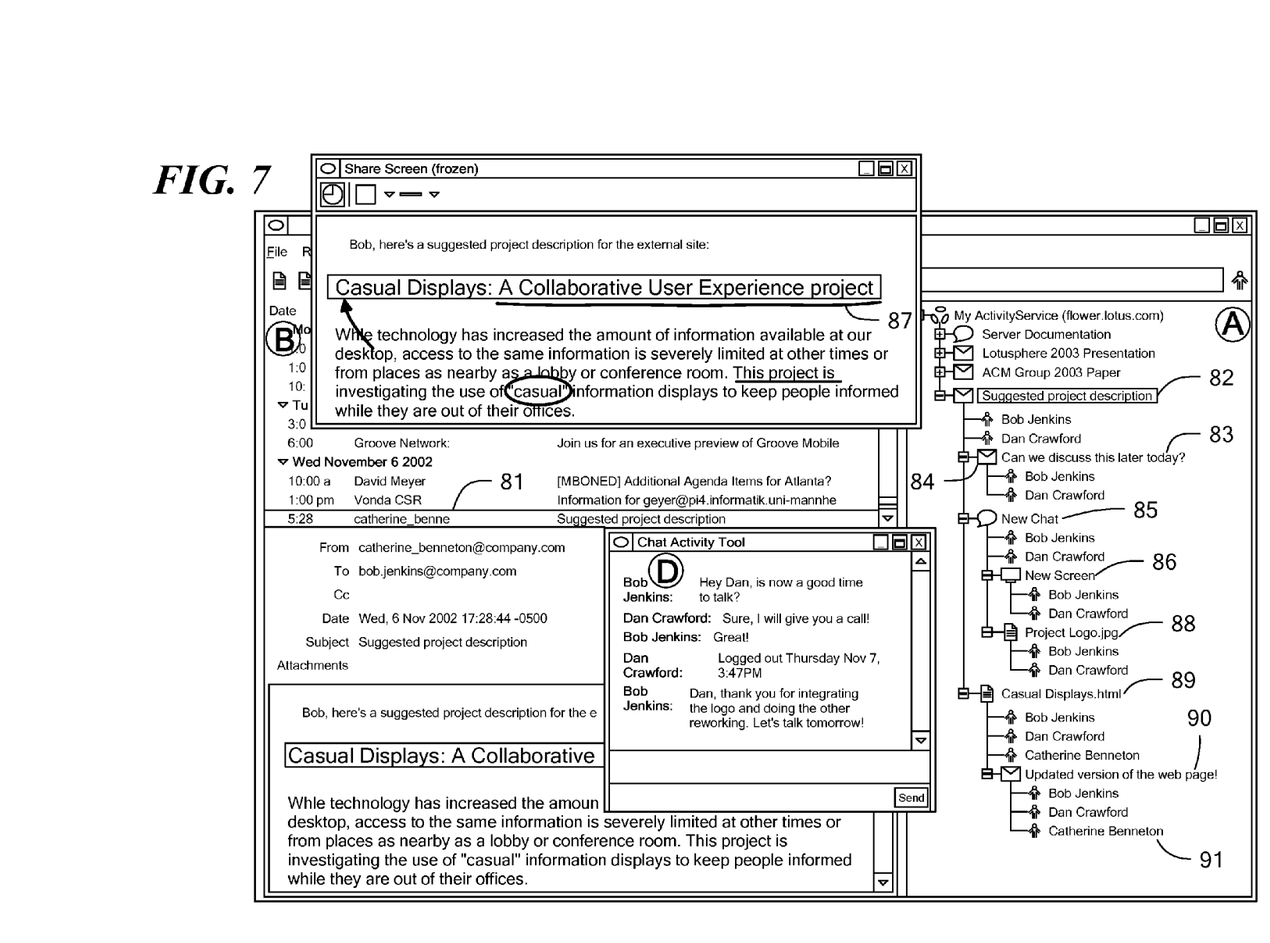
FIG. 7 illustrates screenshots for the purpose of describing how the servers of FIGS. 1 and 6 and the processes of FIGS. 3 and 4 may be used to enable synchronous collaboration between multiple users.

An example of how Generic Shared Objects (GSOs) may be managed by a GSO server of the present invention to seamlessly provide synchronous, real-time collaboration and asynchronous collaboration between multiple users will now be described with reference to FIG. 7. Bob is a project lead and he works with Dan on a project on "Casual Displays". Catherine is a web designer in their company who is responsible for the external web site. At 81, Bob receives an email from Catherine containing a draft for a project description that she would like to put on their external web site. She wants some feedback from Bob. Before getting back to her, Bob wants to discuss the design of that web page with Dan. Instead of forwarding the message to Dan via email, Bob decides to start a new activity by creating a shared object based on this message. He right-clicks on the original message in his inbox, selects "share", enters Dan's email address, and hits "Share". At 82, a new shared message object (with Bob and Dan as members) shows up in Bob's activity tree in the right window pane (screen A). Bob right-clicks on the shared object and adds a new shared message to the initial one, because he wants to let Dan know that he would like to discuss this with him. At 83, Bob's message shows up as a reply to the initial message similarly to a newsgroup thread.

A few hours later, Dan returns to his desktop, which is running the client, and notices Bob's newly created shared messages. He opens one message and while he is reading it, at 84 Bob sees that Dan is looking at the messages because the shared object is lit green along with Dan's name underneath the object. Bob takes this as an opportunity to begin a discussion with Dan within the context of the shared object. He right-clicks on the initial message and adds a chat object to this activity at 85. A chat window D pops up on Dan's desktop and they chat. In their chat conversation, Bob and Dan continue talking about the web page over the phone. At some point during the discussion, Bob wants to show directly how to change the web page. He right-clicks on the chat object in his activity tree and adds a shared screen object (86). A transparent window allows Bob to select and "screen scrape" any region on his desktop. He freezes the transparent window over Catherine's draft web page. The screen shot pops up on Dan's desktop. Bob and Dan begin annotating the web page in real-time like a shared whiteboard (87). As they discuss a few changes, Bob is asking Dan to integrate a project logo into the web page. Dan agrees but is pressured now to run to another meeting. He says good-bye to Bob and tells him that he will check with him next day. Dan closes all his windows and as he leaves, his name turns gray throughout all of his shared objects displayed on Bob's client.

Now alone, Bob continues annotating the web page. He also types in a few lines for Dan in the chat window before closing it. He then right clicks on the chat object and creates a new shared file object. He picks the logo file from his local file system and the file object becomes part of Bob's and Dan's activity thread (88). Bob closes all windows and leaves. Next morning when Dan returns to his office, he finds Bob's additional annotations, his chat message, and the project logo file. He starts working on the web page and few hours later, he puts the reworked page into the activity thread as a shared file object (89) and adds a message with some comments (90). He also shares these two objects with Catherine (91) so that she can download and deploy the newly revised web page and logo.

This scenario demonstrates how the collaboration server enables a user to move seamlessly and effortlessly back and forth from private to public information and from asynchronous to synchronous real-time collaboration, without manually creating a shared workspace or setting up a conference. Collaboration starts off with a single shared object and evolves into a multi-object activity, which is structured by a dynamic group of participants as they create and add new shared objects. An activity thread provides the conversational context and awareness for an emerging collaboration; it allows aggregating a mix of different object types. The various objects (message, chat, file etc.) presented in this scenario could be represented through GSOs managed by the collaboration server and the hierarchical relationship of activity threads could be managed through the relation database of the collaboration server.

Thus a collaboration server and operation thereof has been described with regard to various figures. As mentioned above, the functional components of the collaboration server and client API may be implemented in any combination of hardware and software. FIGS. 4 and 5 are state diagrams and flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

What we claim is:

1. An object server computer system comprising:
    a storage device, including a computer readable memory, for storing an object data structure having a plurality of entries defining attributes of an object, the plurality of attributes apportioned into general entries and variable entries, the general entries including a list of member client devices having access to the object and the variable entries including at least one item of persistent information associated with the object;
    wherein the general entries of the object data structure are defined by object server and the variable entries of the object data structure are defined and managed by any of the member client devices on the list of the member client devices; and
    broadcast logic for broadcasting a notification package regarding a modification to at least one of the attributes of the object to member client devices in the list of member client devices that are also subscribed to receive notification packages regarding modifications to the attribute of the object and that are also currently connected to the object server to share data and collaborate in real-time, not broadcasting the notification package to member client devices in the list of member client devices that are not subscribed to receive such notification packages regarding modifications to the at least one of the attributes of the object, and not broadcasting the notification package to member client devices in the list of member client devices that are not currently connected to the object server to share data and collaborate in real-time.

2. The object server computer system of claim 1, wherein the storage device stores a plurality of object data structures associated with a plurality of objects, each one of the plurality of object data structures including a plurality of entries defining attributes of a corresponding one of the plurality of objects, the object server further comprising:
    a navigation logic including a relation database identifying relationships between different ones of the plurality of objects, the navigation logic also including logic for identifying a set of the plurality of objects that are affected by a change to a data structure of a given object of the plurality of objects; and
    wherein, the broadcasting logic further includes logic for broadcasting the notification package regarding the modification to the data structure of the given object to member client devices in the list of member client devices of each object in the set of the plurality of objects identified by the navigation logic.

3. The object server computer system of claim 1, wherein the general entries include at least one of a unique identifier, name, author, creation time, modifier, modification time, reader, last access time, access control list with member and group objects, member status and subscription information pertinent to the object.

4. The object server computer system of claim 1, wherein a plurality of variable entries are associated with each object, and wherein each variable entry includes a name of an item of information associated with the entry, and a value of the item of information associated with the name.

5. The object server computer system of claim 1, wherein each variable entry includes access history information, associated with the item of information, the history information including identifying member client devices of the group having access to the object that have accessed the object.

6. The object server computer system of claim 5, wherein the access history information includes information regarding a type of access of each member client device having accessed the object.

7. A method embodied in an object server computer system, the object server computer system including at least one processor and a computer readable storage medium having program code stored on for, when executed by the at least one processor, providing an object server by performing steps comprising:
    storing on a storage device in the object server an object data structure having a plurality of entries defining attributes of an object, the plurality of attributes apportioned into general entries and variable entries, the general entries including a list of member client devices having access to the object and the variable entries including at least one item of persistent information associated with the object, wherein the general entries of the object data structure are defined by the object server and the variable entries of the object data structure are defined and managed by any of the member client devices on the list of the member client devices; and broadcasting by the object server a notification package regarding a modification to at least one of the attributes of the object to member client devices in the list of member client devices that are also subscribed to receive notification packages regarding modifications to the attribute of the object and that are also currently connected to the object server to share data and collaborate in real-time, not broadcasting the notification package to member client devices in the list of member client devices that are not subscribed to receive such notification packages regarding modifications to the at least one of the attributes of the object, and not broadcasting the notification package to member client devices in the list of member client devices that are not currently connected to the object server to share data and collaborate in real-time.

8. The method of claim 7, wherein the storage device stores a plurality of object data structures associated with a plurality of objects, each one of the plurality of object data structures including a plurality of entries defining attributes of a corresponding one of the plurality of objects, and the steps further comprising:

identifying in a relation database relationships between different ones of the plurality of objects and a set of the plurality of objects that are affected by a change to a data structure of a given object of the plurality of objects; and broadcasting the notification package regarding the modification to the data structure of the given object to member client devices in the list of member client devices of each object in the set of the plurality of objects identified by the navigation logic.

9. The method of claim 7, wherein the general entries include at least one of a unique identifier, name, author, creation time, modifier, modification time, reader, last access time, access control list with member and group objects, member status and subscription information pertinent to the object.

10. The method of claim 7, wherein a plurality of variable entries are associated with each object, and wherein each variable entry includes a name of an item of information associated with the entry, and a value of the item of information associated with the name.

11. The method of claim 7, wherein each variable entry includes access history information, associated with the item of information, the history information including identifying member client devices of the group having access to the object that have accessed the object.

12. The method of claim 7, wherein the access history information includes information regarding a type of access of each member client device having accessed the object.

13. A computer program product including a computer readable storage medium, said computer readable storage medium having program code stored thereon for providing an object server, said program code comprising:

program code for storing on a storage device in the object server an object data structure having a plurality of entries defining attributes of an object, the plurality of attributes apportioned into general entries and variable entries, the general entries including a list of member client devices having access to the object and the variable entries including at least one item of persistent information associated with the object, wherein the general entries of the object data structure are defined by the object server and the variable entries of the object data structure are defined and managed by any of the member client devices on the list of the member client devices; and program code for broadcasting by the object server a notification package regarding a modification to at least one of the attributes of the object to member client devices in the list of member client devices that are also subscribed to receive notification packages regarding modifications to the attribute of the object and that are also currently connected to the object server to share data and collaborate in real-time, not broadcasting the notification package to member client devices in the list of member client devices that are not subscribed to receive such notification packages regarding modifications to the at least one of the attributes of the object, and not broadcasting the notification package to member client devices in the list of member client devices that are not currently connected to the object server to share data and collaborate in real-time.

* * * * *